25911

Aug. 21, 1962 H. E. VAUGHAN 3,050,589

MULTIPLEX SIGNALING SYSTEM

Filed Sept. 11, 1958 2 Sheets-Sheet 1

INVENTOR
H. E. VAUGHAN
BY R. C. Winter
ATTORNEY

INVENTOR
H. E. VAUGHAN
BY
R. C. Winter
ATTORNEY

United States Patent Office 3,050,589
Patented Aug. 21, 1962

3,050,589
MULTIPLEX SIGNALING SYSTEM
Henry E. Vaughan, Chatham, N.J., assignor to Bell Telephone Laboratories, Incorporated, New York, N.Y., a corporation of New York
Filed Sept. 11, 1958, Ser. No. 760,480
15 Claims. (Cl. 179—18)

The present invention relates to signaling systems and more particularly to selective signaling means for use in communication systems operated in time division multiplex.

In order to consolidate equipment and conserve communication paths in a telephone system, considerable effort is being directed to the development of systems utilizing time division rather than, or in conjunction with, space division as heretofore exclusively employed. Essentially, in space division each connection between two telephones is established over a distinct transmission path, while in time division a single transmission path may be shared by a plurality of pairs of communicating parties. The latter operation is accomplished by sampling each conversation in turn at a high repetition rate, the speech samples being filtered at the terminals to produce a remarkably accurate facsimile of the transmitted intelligence.

Further refinement is realized by the introduction of pulse code modulation of the sampled intelligence to ease transmission requirements of the system. Such a system, incorporating time division sampling techniques and pulse code modulation of the sampled intelligence for transmission, is disclosed in D. B. James, J. D. Johannesen, M. Karnaugh and W. A. Malthaner Patent No. 2,957,949, issued October 25, 1960.

The system disclosed in the above-cited application also incorporates a centralized control type of operation such that signaling equipment advantageously is located at the central control point for service to the entire system including a plurality of remote concentrator units. This expedient obviates the duplication of ringing equipment at each of the remote concentrator units.

A number of distinct signaling indications including ringing tone, busy tone, dial tone, etc., are required in such a system. As these signaling indications must pass over the common transmission link between the central control source and the calling and called parties, they too must be sampled on a time division basis and the samples placed in coded form. It is essential that each signaling indication be available on request to every station in the system in the sampling time allotted to such station.

The central control itself is not equipped to encode speech samples since this function is performed exclusively at the remote concentrator units, the central control serving merely to switch the coded samples through to the proper termination. Thus, in order to supply each telephone in the system with any one of a plurality of different tones originating from a central control point, it is necessary to provide coding equipment at the central point so as to place each tone in coded form for transmission to the outlying stations.

The provision of distinct coding equipment for each desired tone is both uneconomical and inefficient. In such an arrangement a coder per tone would provide a distinct coded sample of the preassigned tone in each sampling interval or time slot in a recurrent cycle of time slots. It is probable that each tone would be required by the system in only a small fraction of the total time slots, so that during the remainder of each cycle, each coder would be operating needlessly.

It is an object of this invention to provide an improved time division multiplex signal coding circuit.

It is another object of this invention to provide an economical signal coding circuit which utilizes the maximum potential of the coding apparatus.

It is a further object of this invention to provide a single coding circuit which will furnish a plurality of coded signals simultaneously.

These and other objects of the invention are attained in one specific illustrative embodiment wherein a tone coding circuit comprises a single coder of a type known in the art in which samples of low frequency signals are placed in digital or binary code form. One form of coder satisfactory for this purpose is that disclosed in J. R. Pierce Patent 2,451,044, issued October 12, 1948 The tone signal samples are gated sequentially into the coder which, in turn, translates the samples into digital form and gates them sequentially to output terminals corresponding to the signal sources.

A time shared telephone system of the type described shares a common transmission link among a number of simultaneous conversations by dividing a prescribed time interval, known as a frame, into a plurailty of sampling intervals known as time slots. Each active line is assigned a time slot and is sampled in that time slot during successive frames. Sampling at a sufficiently high rate permits accurate reproduction of the original speech at the receiving terminal. An acceptable frame rate is eight kilocycles or twice the highest speech frequency to be transmitted. With this frame rate each conversation is sampled once every $1/8000$ of a second, or 125 microseconds. Assuming 25 time slots available in the frame, the interval of each time slot is $1/25\times8000$th of a second, or 5 microseconds. Each conversation then is sampled repetitively during a distinct 5 microsecond time slot in every 125 microsecond frame.

In such a telephone system each of a plurality of tones must be available for instantaneous assignment in any one of the time slots of the frame. With the low frequency tones employed, a new tone sample per frame interval is sufficient for the system to reproduce the original tone. Thus at the eight kilocycle frame rate of the above example, each cycle of a 400 cycle tone would be sampled twenty times, an amount which will permit adequate reproduction of the original tone by the system. However, this tone sample must appear in each time slot of the frame in order to satisfy the system's requirement that tones be available for instantaneous assignment in each idle time slot.

The employment of a single coder to process samples from a plurality of tone sources sequentially in each frame presents a problem in that it permits the appearance of each tone at a corresponding output terminal for only a single time slot in the frame. A new sample of the same tone will appear at the corresponding output terminal during the same time slot in the next succeeding frame, but during the balance of the frame, there is no coded sample at the output terminal as required by the time shared telephone system.

This difficulty is overcome, in accordance with this invention, by the provision of circulating delay means at each output terminal. In this fashion a coded sample delivered to an output terminal will appear in successive time slots until replaced by a new coded sample delivered to the terminal by the coder to replace the sample currently being circulated. Advantageously, such delay means may comprise a shift register, as known in the art, having its serial output connected to its serial input. The time required to shift the digits of the coded sample through the shift register is established so as not to be greater than the time slot interval. Input digits will take precedence over digits being circulated in the register. In the absence of input digits, however, the digits present in the register will be continuously recirculated through the register.

It is a feature of this invention that a plural signal coding circuit comprise a single coder, a plurality of signal sources, first gating means for connecting each signal source in turn to the coder, a plurality of storage means, and second gating means for connecting the output of the coder to each storage means in turn.

It is another feature of this invention that the coder is connected in sequence to each signal source and to each storage means for recurrent sampling intervals.

It is a further feature of this invention that the storage means comprises circulating delay means to store a particular coded sample during successive time intervals and until a new coded sample is received from the coder.

A complete understanding of these and other features of this invention may be gained from consideration of the following detailed description, together with the accompanying drawing, in which.

Figure 1:
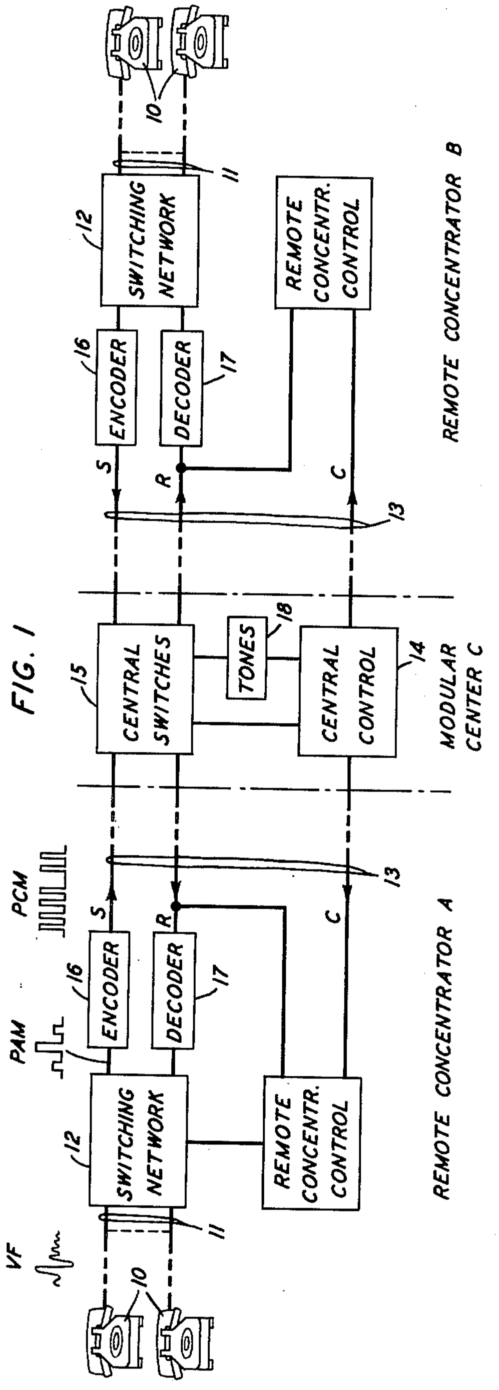
FIG. 1 is a schematic representation in block diagram form of a telephone system in which a signaling circuit in accordance with this invention may be employed.

Turning now to the drawing, there is depicted in FIG. 1 a telephone system of the type disclosed in the aforementioned D. B. James et al. application, wherein circuits in accordance with my invention may advantageously be employed. In this system a plurality of subscriber telephones 10 are individually connected to subscriber lines 11 and may be selectively connected by a switching network 12 in remote concentrator units A and B to a modular center C over common transmission links 13. Control equipment 14 in the modular center C then is operated, for example, in accordance with signals from a subscriber telephone 10 at remote concentrator A to complete a connection through the central switches 15 to a called subscriber's telephone in the same concentrator A, in remote concentrator B or over trunks to other remote concentrators and foreign telephone systems.

Advantageously, the system may be operated on a time division multiplex basis in which each subscriber's telephone 10 is assigned a particular sampling period or time slot in a cyclically recurring group of time slots; the repetitively recurring cycle of time slots is referred to as a frame. Upon each occurrence of a time slot assigned to a particular calling subscriber's telephone a sample of information is transmitted from his telephone through the switching network 12 to encoder 16 at the remote concentrator. The sample is transformed into a series of digital impulses and transmitted over the S lead of transmission line 13 to the central switches 15 at the modular center C. From the modular center C the signal sample, still in digital form, is transmitted to the receiving subscriber's telephone. Considering that the receiving subscriber is located in another remote concentrator, the digital signal is transmitted over the R lead of another transmission line 13 to decoder 17 at the remote concentrator where it is restored to a voice frequency signal and received at the receiving subscriber's telephone in the same time slot of a succeeding frame.

It may be noted in this brief outline of the system operation that all transmission between the remote concentrator units and the switching center is accomplished in digital form and that the equipment for translation between voice frequency and digital signals is accomplished at the remote concentrator units.

The same transmission lines 13 are employed for talking and signaling. Thus the various signaling tones must also be placed in digital form to permit transmission over the common links. Equipment to provide the various tones advantageously is located at the modular center C and is provided in common to all remote concentrator units, thus obviating duplication of expensive tone generating equipment at each of the remote concentrator units. Such tone control equipment 18 appears in FIG. 1 connected between the central control 14 and central switches 15 at the modular center C. As all signals transmitted through the modular center C are in digital form, the variety of tones generated at the modular center as required in such a large scale telephone system must also appear in digital form.

Assume that two subscriber telephones 10 in distinct remote concentrators such as A and B require ringing tone and are assigned time slots 1 and 2, respectively. The control equipment at the switching center would be activated to connect the coded ringing tone sample to the R leg of the transmission line 13 to concentrator A during the first time slot and to concentrator B during the second time slot. Similarly, subscriber telephones in other remote concentrator units may require ringing tone in time slots 1 and 2 or other time slots of the frame, whereupon the coded ringing tone samples are applied to the R leg of each transmission line 13 to such other remote concentrator units. It is evident, therefore, that a coded sample of the ringing tone must be available during each time slot of the frame and that the coded samples must be changed in each successive frame to perpetuate the time divided ringing tone.

Figure 2:
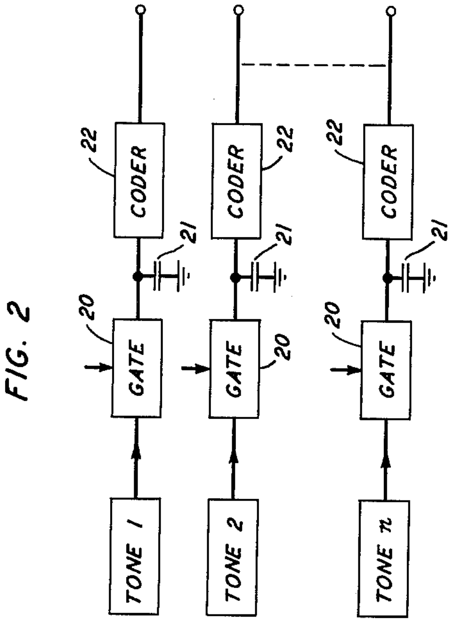
FIG. 2 is a schematic representation of a signaling circuit employing distinct coding means for each signal source, as known in the art.

Considering that a large number of tones must be available in such a telephone system, the duplication of coding equipment, as noted in FIG. 2, to process each tone, would be costly. In this arrangement a sample of each tone 1 to $n$ is stored in a corresponding condenser 21 during each time slot interval by operation of the corresponding gate 20. Each sample is then placed in digital form in the corresponding coder 22 and made available at its output terminal.

It may be noted that the circuit of FIG. 2 provides a new coded sample of each tone during each time slot of the frame. However, as indicated hereinbefore, the system merely requires that a new coded sample of each tone be made available in each successive frame. It is possible, therefore, to eliminate the duplication of equipment noted in FIG. 2 by employment of a coding circuit in accordance with my invention.

Figure 3:
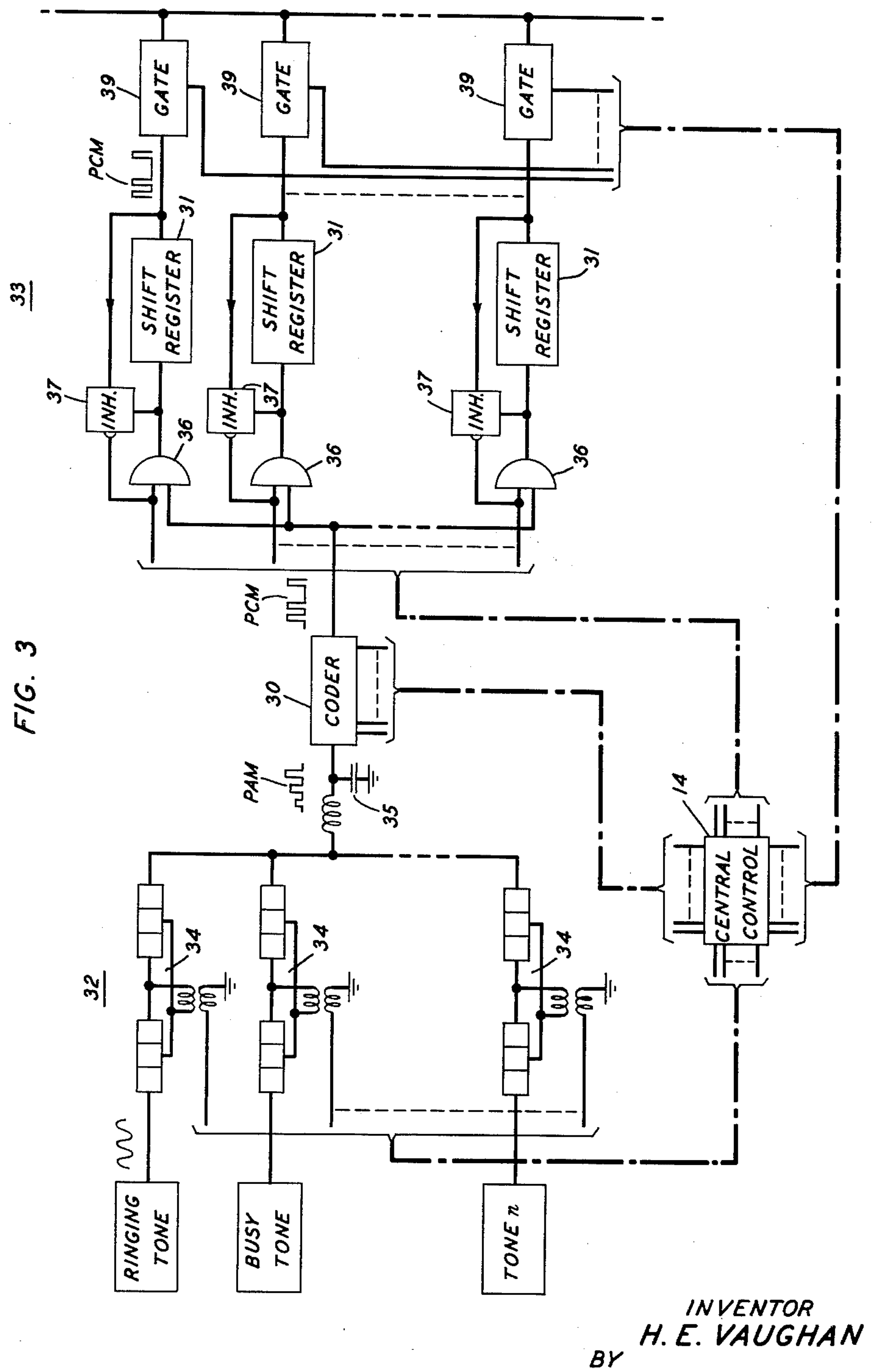
FIG. 3 is a schematic representation of one illustrative embodiment of a signaling circuit in accordance with this invention that may be employed in the telephone system of FIG. 1.

One specific illustrative embodiment of a signaling circuit in accordance with my invention is depicted in FIG. 3 and comprises a single coder 30, storage means 31 and sequence switches 32 and 33 at the input and output of the coder 30, respectively. The various tones required in the telephone system shown in FIG. 1 are represented specifically in FIG. 3 by ringing tone and busy tone sources, though other tone sources for other purposes are also provided, as indicated in FIG. 3.

The switch 32 comprises sampling gates 34 connected to each tone source. The gates are enabled in sequence by control signals from central control 14 so as to transmit samples of each tone to the coder 30. The sampling time has an established duration less than one time slot interval, and each tone source is sampled once per frame interval.

The switch 33 at the coder output serves to direct the coded signal samples sequentially to a corresponding one of the storage means 31. The operating sequence of switch 32 is synchronized with the operating sequence of switch 33. Each particular tone source, therefore, will have a corresponding receptacle for storage of coded samples of its frequency.

The sequentially operated switches 32 and 33 advantageously may comprise logic circuitry adapted to high speed operation. Gating circuitry for transfer of voice frequency signals demands greater accuracy than that required for transfer of digital signals. Thus the sequence switch 32 advantageously may comprise a series of bilateral transistor gates of the type disclosed in J. D. Johannesen, P. B. Myers and J. E. Schwenker Patent No. 2,899,570, issued August 11, 1959.

The transistors in such a gate normally afford a high impedance to the passage of signals therethrough, but upon the application of a control signal to appropriate terminals, the transistors will assume a very low impedance state during which signals may be transmitted therethrough with negligible loss. The control signal is removed at the end of the sampling period, thereby restoring the high impedance condition of the transistors. Appropriate control signals in the instant system are provided by the central control 14 and take the form of accurately timed pulses applied to each gate in sequence.

The coder 30 acts upon each tone sample passed by the sequence switch 32 and stored in condenser 35. Advantageously, an inductance is inserted between the sequence switch 32 and the condenser 35, as indicated in FIG. 3, to permit low loss transfer of the tone samples through the sequence switch 32 in accordance with the resonant transfer circuit disclosed by W. D. Lewis in his Patent No. 2,936,337, issued May 10, 1960.

One form of coder satisfactory for this purpose, as disclosed in the aforementioned patent to J. R. Pierce, performs comparisons of this sample with precise reference amplitude control signals received successively from central control 14. Each reference signal is one-half the amplitude of the preceding reference signal. If a reference signal amplitude is greater than that of the sample, a zero output signal representative of one binary code digit is provided, and the reference signal is rejected. If a reference signal amplitude is smaller than that of the sample, an output signal representative of the other binary digit is provided, and the reference signal is added to the succeeding reference signal. After a plurality of such trial comparisons the reference signal amplitude will closely match that of the sample, and the coded information provided in the interim will define this final amplitude.

Advantageously, compressor circuitry, as known in the art, may be employed in conjunction with the coder 30 to reduce the amplitude of the signal sample. The coder circuitry may be simplified by this expedient, since fewer digits are required to identify a compressed signal sample. In addition, the telephone system of FIG. 1 employs compressors in the common transmission paths so that compressed coded tone samples are desirable.

Coder output switch 33, for passage of digital signals in sequence, may be of considerably simplified form and may comprise, for example, a plurality of AND logic gates 36 of types known in the art connected in common to the coder output. A second input to each of the AND gates is connected to the common control 14 from which pulses are applied in sequence to the AND gates. The AND gate is enabled solely upon the simultaneous occurrence of pulses at each of its inputs. At all other times the AND gate will block the passage of signals therethrough. Thus upon the simultaneous appearance of an output signal from the coder 30 and a control signal from common control 14 at the inputs of any one of the AND gates, the coder output signal will be transmitted through the selected AND gate. Coded signal samples are therefore made available at the output of each AND gate 36 corresponding to the samples taken from the tone sources.

As each tone is sampled during only one time slot in each frame, a coded sample is available at the output of each AND gate only during a single time slot interval per frame. The telephone system depicted in FIG. 1 requires that each coded tone be available for sampling during every time slot of the frame, as described hereinbefore. Thus, in accordance with this invention, storage means 31 are provided for assuring that coded samples transmitted through the coder output switch 33 are stored for a complete frame interval and are repeated at an output terminal during each time slot interval of the frame. Each of the storage means 31 may comprise a shift register of a type known in the art which registers will circulate the coded signal samples and have the samples available at corresponding outputs in serial form at the beginning of each time slot. The output of each shift register is connected to its input so that once a coded sample is inserted in a shift register it will continue to circulate therethrough until a new coded sample is received.

A shift register satisfactory for this purpose, as shown for example in High-Speed Computing Devices, Engineering Research Associates, Inc., page 299, FIGS. 13–25, McGraw-Hill Book Company, Inc., New York, 1950, may comprise a series of bistable flip-flop circuits. Application of each digit of the coded word to the first flip-flop in conjunction with a shift pulse from the central control 14 will cause the flip-flop to reverse its state or remain in the current state, dependent upon the type of digit signal received. Similarly, the state of each flip-flop, upon application of the shift pulse, will be determined by the current state of the preceding flip-flop.

The digit signal emanating from the final stage of each shift register is transmitted to a corresponding output gate 39 and through a corresponding logic circuit 37 to the first register stage to permit the continuous circulation of the coded signal sample. Upon receipt by one of the AND gates in switch 33 of a control signal indicative of the availability of a new coded sample for the corresponding output terminal, the logic circuit 37 connected between the output and input of the corresponding shift register is activated to inhibit passage of digit signals therethrough. Upon completion of storage in the shift register of the new coded signal sample, the control signal is removed from inhibit circuit 37, and the digit signals of this coded sample are recirculated in the register. Inhibit logic circuits suitable for use as logic circuit 37 are known in the art.

Figure 4:
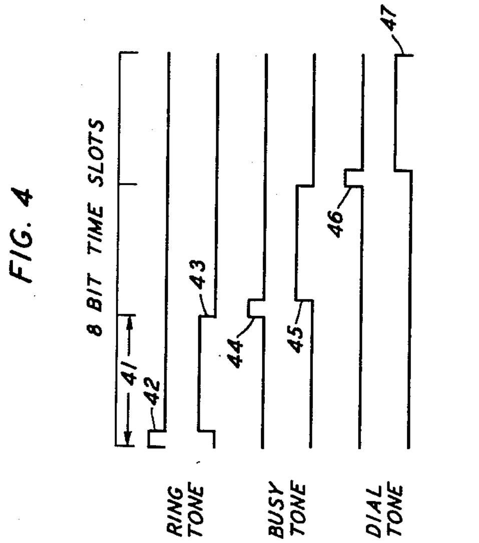
FIG. 4 is a pulse sequence chart indicating the operation of the circuit of FIG. 3.

Timing of the control operations is established such that at the beginning of each time slot interval the first digit of a coded sample is available at each corresponding output gate 39. The time slot interval is of sufficient length to accommodate an entire coded tone sample. The timing for this circuit operation may best be understood by reference to the pulse sequence chart indicated in FIG. 4. The interval 41 represents a time slot sufficient to include eight binary digit pulses or bits, the length selected for the telephone system depicted in FIG. 1. An eight bit word is more than adequate to define any discrete frequency level. Low frequency tone signals in turn may be defined by as few as two code bits, the balance of the time slot interval acting as a guard space. During this guard space, for example, storage condenser 35 may be grounded to remove all traces of one signal sample prior to arrival of the next sample.

Sampling in the system of FIG. 1, as noted hereinbefore, may occur at an eight kilocycle repetition rate. Thus the frame interval, during which each tone is sampled in sequence is $\frac{1}{8000}$ of a second. Sampling is initiated by a pulse 42 from central control 14 which enables gate 34 connected to the ringing tone source, FIG. 3, at the beginning of a time slot 41. During this interval a sample of the ringing tone is transmitted to the coder 30. The sample is then placed in coded form assuming a configuration such as shown at the output of the coder 30 in FIG. 3. Concurrent with the availability of the first binary digit or bit of the coded word, a signal 43 from the central control 14 enables AND gate 36 of sequence switch 33 corresponding to the ringing tone source. The signal 43 is also transmitted to the corresponding logic circuit 37 to inhibit the transfer of the coded word then present in shift register 38 from continuing to circulate therein. The new coded word is then shifted serially into the shift register 38 and is available at terminal 39 at the beginning of the next time slot 41.

The same sequence of operations is then repeated for each of the remaining tones in order, control pulses 44 and 45 enabling the gates corresponding to the busy tone source and pulses 46 and 47 operating the gates corresponding to the next tone source. Upon completion of sampling of all available tones, switches 32 and 33 will be maintained inactive until a complete frame interval has elapsed, whereupon the tones are again sampled sequentially and processed through the circuit to replace the coded samples stored during the previous frame. The length of a frame in the telephone system depicted in FIG. 1 may be established at 25 time slots, as noted hereinbefore, such that up to 25 tones could be made available with the instant invention during each frame, utilizing the single coder 31.

While my invention has been disclosed with reference to particular logic circuitry in conjunction with a coder and shift register elements, it may be noted that various component substitutions are permitted. For example, a coder of the cathode ray tube type, as disclosed in W. M. Goodall Patent 2,616,060, issued October 28, 1952, may be utilized in place of the coder described hereinbefore. Also, the shift register storage means may be replaced by various forms of circulating delay means, as known in the art, to provide the essential storage operation at the coder output.

It is to be understood that the above-described arrangements are illustrative of the application of the principles of the invention. Numerous other arrangements may be devised by those skilled in the art without departing from the spirit and scope of the invention.

What is claimed is:

1. In a time division switching system, the combination for providing discrete coded samples of a plurality of tone signal frequencies to a transmission line comprising a plurality of distinct signal frequency sources, a coder, first gating means for connecting any one of said sources to said coder, means for enabling said first gating means to connect each of said sources to said coder in a particular time slot in a repeated cycle of said time slots, a plurality of storage means, second gating means for connecting the output of said coder to any one of said storage means, means for enabling said second gating means to connect said coder to each of said storage means in the time slot reserved for a corresponding one of said sources, third gating means for selectively connecting the output of any one of said storage means to said transmission line in any one of said time slots, and means for continuously circulating the coded signal samples provided by said coder through said storage means.

2. In a time division multiplex communication system employing pulse code modulated transmission signals, the combination for making available a plurality of coded tones for selective sampling by said system comprising a coder, first switching means for selectively connecting a plurality of different frequency tone sources to said coder, digital storage means corresponding to each of said tone sources, second switching means for selectively connecting said coder to said storage means, and means for operating said first and second switching means in synchronism to store coded samples of tones from said sources in said corresponding digital storage means.

3. In at time division multiplex communication system, the combination in accordance with claim 2 further comprising means for continuously circulating said coded samples of tones in said digital storage means.

4. In a time division communication system, the combination in accordance with claim 3 further comprising means for blocking the recirculation of said coded samples of tones in said digital storage means and means for enabling said blocking means responsive to receipt in said digital storage means of one of said coded samples of tones.

5. A tone conversion circuit comprising a plurality of distinct tone sources, pulse code modulating means, first means for directing samples of tones from each of said tone sources to said pulse code modulating means in sequence, a plurality of pulse registering means, each capable of storing a tone sample in coded form, second means for directing a tone sample in coded form from said pulse code modulating means to one of said pulse registering means corresponding to said source providing said tone sample, and means for continuously circulating said coded sample in said pulse registering means.

6. A tone conversion circuit in accordance with claim 5 further comprising means for synchronizing the operation of said first and second sample directing means.

7. A tone conversion circuit in accordance with claim 5 further comprising means for blocking the recirculation of a coded sample in said pulse registering means upon receipt at said pulse registering means of a new coded sample.

8. In a communication system, apparatus for providing each of a plurality of signaling tones in digital form during each of a succession of time slot intervals in a frame interval comprising means for coding tone frequency samples in digital form, means for directing samples of a plurality of tone frequencies to said coding means in successive time slot intervals of a recurrent frame of time slot intervals, means for storing coded samples of corresponding tone frequencies, means operated in synchronism with said directing means for directing coded samples from said coding means to said corresponding storage means, means for recirculating said coded samples through said storage means, and means for inhibiting such recirculation upon receipt of subsequent coded samples at said storage means.

9. A tone conversion circuit comprising a plurality of distinct tone sources, coding means, means for sampling the tones from said tone sources on a selective basis, means for applying said tone samples in sequence to said coder, circulating delay means corresponding to each of said tone sources, means for selectively connecting the output of said coder to each of said delay means in sequence, and means for synchronizing the operation of said sampling means and said connecting means.

10. A tone conversion circuit in accordance with claim 9 further comprising means for inhibiting the reentry of information stored in said circulating delay means and means including said connecting means for activating said inhibiting means.

11. A signal conversion circuit comprising a plurality of distinct signal frequency sources, a coder, first gating means for connecting any one of said sources to said coder, means for enabling said first gating means to connect each of said sources individually and in time sequence to said coder, a plurality of storage means, second gating means, means for enabling said second gating means to connect said coder to each of said storage means individually and in time sequence, and means for continuously circulating through said storage means the coded signal samples provided by said coder.

12. A signal conversoion circuit for placing a plurality of distinct frequency signals in digital form comprising a coder, a plurality of signal sources, first means for connecting each of said signal sources to said coder during distinct time intervals, storage means corresponding to each of said signal sources, and second means for connecting said coder to each of said storage means during corresponding distinct time intervals.

13. A signal conversion circuit in accordance with claim 12 wherein said storage means comprises a plurality of shift registers and further comprising logic means connected between the output and input of each of said shift registers, said logic means being responsive to the receipt of a coded sample to inhibit the recirculation of a coded sample currently stored in said shift register.

14. A signal conversion circuit in accordance with claim 12 wherein said first connecting means comprises a plurality of sampling gates connected to corresponding ones of said signal sources and said second connecting means comprises a plurality of coincidence gates connected to corresponding ones of said storage means.

15. A signal conversion circuit in accordance with claim 14 and further comprising means for enabling said sampling gates and said coincidence gates, respectively, in sequence and in synchronism with each other.

References Cited in the file of this patent

UNITED STATES PATENTS

| | | |
|---|---|---|
| 2,451,044 | Pierce | Oct. 12, 1948 |
| 2,520,185 | Van Mierlo | Aug. 29, 1950 |
| 2,830,120 | Trousdale | Apr. 8, 1958 |
| 2,877,306 | Baker | Mar. 10, 1959 |
| 2,917,583 | Burton | Dec. 15, 1959 |
| 2,929,879 | Jacobaeus et al. | Mar. 22, 1960 |
| 2,936,338 | James et al. | May 10, 1960 |